June 8, 1937. P. C. MANCINO ET AL 2,083,338
UNIVERSAL JOINT
Filed July 3, 1931 2 Sheets-Sheet 1
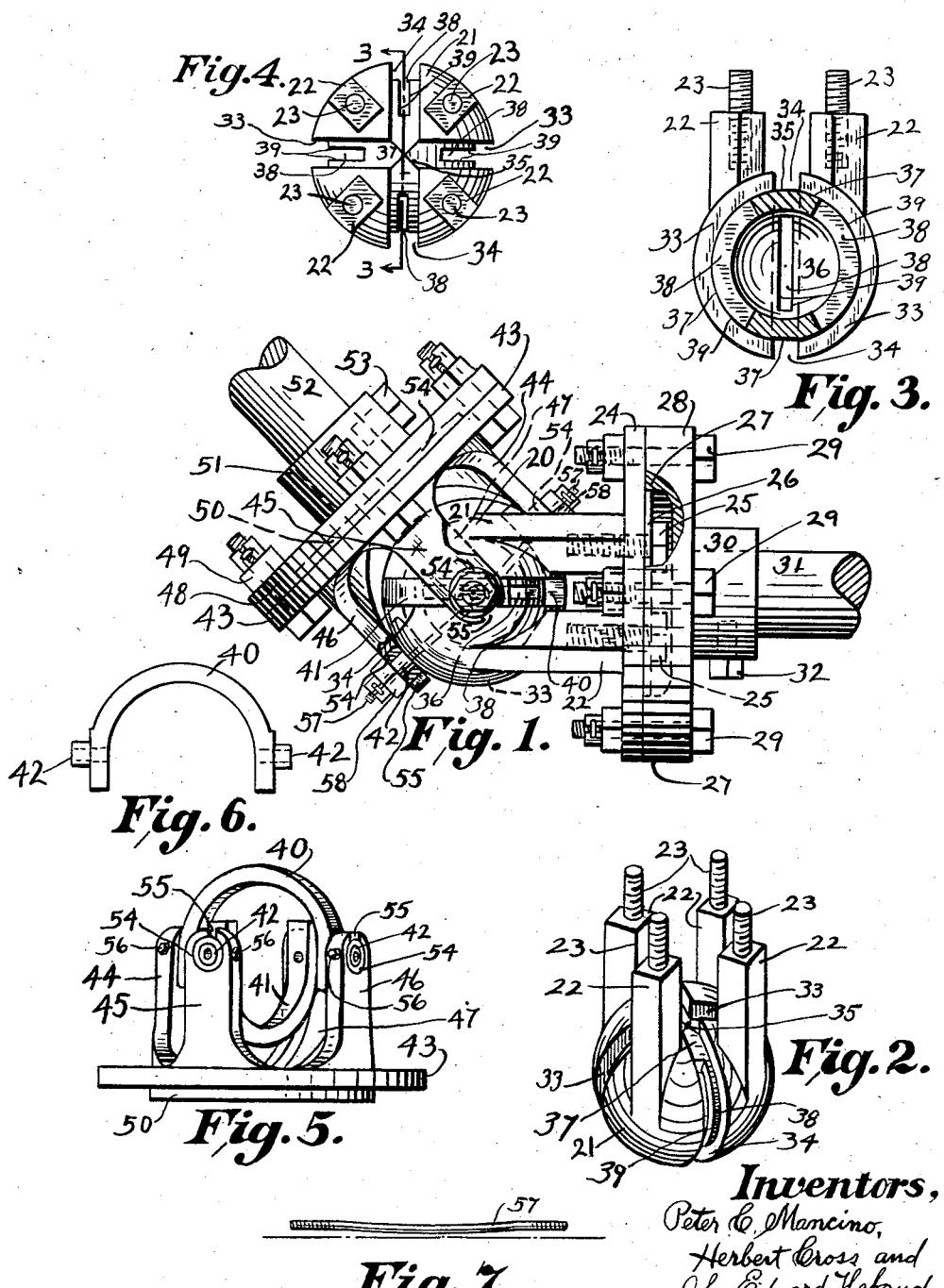
Inventors,
Peter C. Mancino,
Herbert Cross and
John Edward Thebaud June 8, 1937.  P. C. MANCINO ET AL  2,083,338
UNIVERSAL JOINT
Filed July 3, 1931   2 Sheets-Sheet 2

Inventors,
Peter C. Mancino,
Herbert Cross and
John Edward Thebaud.

Patented June 8, 1937

2,083,338

UNITED STATES PATENT OFFICE 2,083,338

UNIVERSAL JOINT

Peter C. Mancino, Philadelphia, Herbert Cross, Cynwyd, Pa., and John Edward Thebaud, North Merchantville, N. J.; said Thebaud assignor to said Cross and said Mancino Application July 3, 1931, Serial No. 548,620

5 Claims. (Cl. 64—16)

This invention relates to universal joints for shafting.

Universal joints for shafting are usually formed having three principal members, one intermediate of the other two members, each of the latter two members is adapted for attachment to a shaft end, and has two arms projecting toward the intermediate member, to which the ends of these two pairs of arms are pivoted in a manner to have the pivotal axis of one pair of arms intersect at right angles, the pivotal axis of the other pair of arms.

Such a combination of pivoted members transfers the torque or turning effort between the shafts, from the two pivotal connections on one shaft connection member, through the intermediate joint member to the two pivotal connections on the other shaft connection member of the joint, thus restricting the amount of power possible to be transferred at a given speed of rotation to the strength of only half the number of pivotal connections employed.

It is our main object to provide a form of universal joint construction which, while employing four pivotal connections, will afford opportunity of transferring the torque from all four pivotal connections in like manner, instead of from two pivotal connections through a third member to two other pivotal connections of the joint, and thus we double the strength of the joint without materially increasing the size of the joint using the same number of pivotal connections as are employed in the usual form of universal joint, above described.

Another object is to dispense with the intermediate joint member of the usual form of universal joint and transfer the torque direct from one shaft member of the joint to the other shaft member, using such construction at the pivotal connections as will afford both a circumferential sliding as well as a pivotal turning, at the connections.

A further object is to provide a form of universal joint which is strong, durable and of simple construction, easily lending itself to the usual methods of manufacture and at the same time adapted to transfer twice the amount of power for a given size of joint, that the usual form of joint is capable of transferring at a given speed.

With these and other objects our invention resides in certain construction, two embodiments thereof are illustrated in the drawings, and are described in detail. Their operation is explained and what we claim is set forth.

In the drawings,

Figure 1 is an elevation of an assembled universal joint embodying our invention.

Figure 2 is a perspective view of the ball element part of one of the shaft connection members of the joint.

Figure 3 is a section of the said ball element part, taken on the line 3—3 of Figure 4.

Figure 4 is a top plan of the ball element shown in Figures 1 and 3.

Figure 5 is a perspective view of part of one of the shaft connection members showing relative position taken by the half ring shoes in the assembled joint when the shafts have a common axis or are in line with one another.

Figure 6 is a plan of one of the half ring shoes.

Figure 7 is a plan of a bent binding bolt lying next to a straight line.

Figures 8, 9, 10, 11:
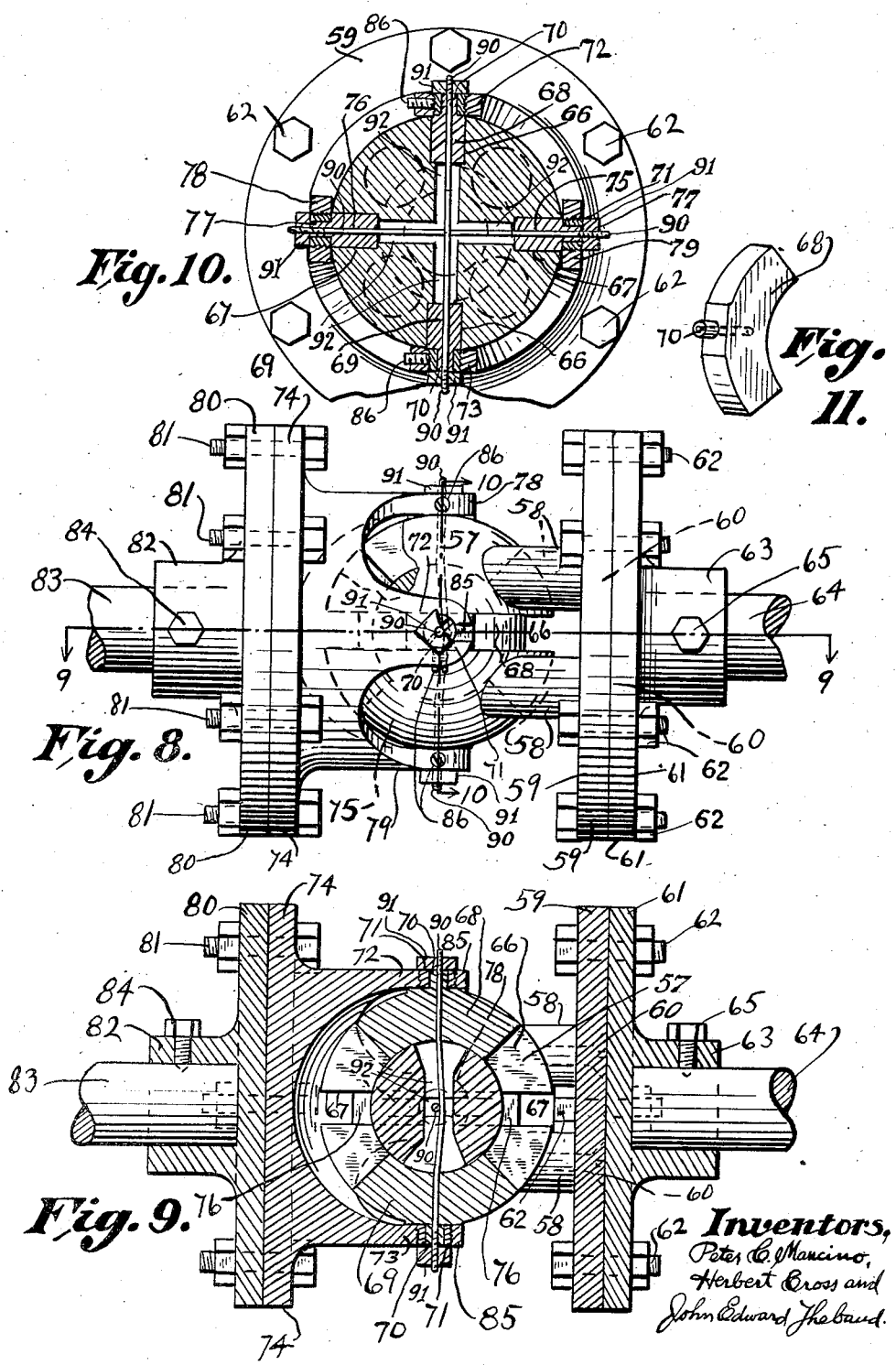
Figure 8 is a plan of another form of universal joint embodying our invention.
Figure 9 is a section taken on the line 9—9 of Figure 8.
Figure 10 is a section taken on the line 10—10 of Figure 8.
Figure 11 is a perspective view of the form of pivotal, curved shoe, used in the joint shown in Figures 8 and 9.

In the figures, referring particularly to Figures 1 to 7, inclusive, the joint 20 is shown to have a ball-like element 21, upstanding from which are four symmetrically disposed posts 22. Projecting from the end of each post 22 is a threaded stud 23. The studs 23, enter holes in a post plate 24, and are held thereto by nuts 25. The post plate 24 has a circular boss 26, centered on and integral with the plate 24, and in turn has centered on it, the flange 27, of the cap plate 28, which is secured to the post plate 24, by bolts and nuts 29. The cap plate 28, has a central boss cup 30, into which fits co-axially, the end of a shaft 31, which is secured by a set screw 32. Crossing at right angles on the element 21, are two meridian grooves 33 and 34, which cross at the point 35, between the posts 22, on the element 21. The inside of the element 21 is hollow, as shown by the cavity 36, within the bottom walls 37, to the grooves 33 and 34. Slots 38, narrower than the grooves 33 and 34, pass through the bottom walls 37, leaving ledges 39, continuous with the outer surface of each bottom wall 37.

In sliding engagement with the grooves 33 and 34, are fitted the respective half ring shoes 40 and 41. The half ring shoe 40, occupying the groove 33, passes between pairs of posts 22, while the half ring shoe 41 occupies the groove 34, and crosses the groove 33, on the opposite side of the member 21, away from the posts 22. Each half ring shoe 40 and 41, has integral therewith, near its ends, two journaling bosses 42, in axial alignment with one another, and having an axial hole therethrough.

In the construction of the universal joint 20, is a post plate 43, complemental to the post plate 24, and has four outstanding posts 44, 45, 46, and 47, positioned symmetrically, to have the element 21 revolvably held within them. To the opposite side of the post plate 43 is secured the cap plate 48, by bolts and nuts 49. The cap plate 48 is centered upon a circular boss cup 50, on the post plate 43, with which it is concentric, and has a central boss 51, into which fits coaxially the end of the shaft 52, which is secured by a set screw 53. In threaded engagement with each of the posts 44, 45, 46, and 47 is a ring 54, beyond which is the slot 55 in the end of each of said last named posts. The width of each slot 55 is that of the diameter of the journaling bosses 42, permitting the boss 42 to pass therethrough. A set screw 56 secured the ring 54 against coming loose. Each half ring shoe, 40 and 41, has passing through its journaling bosses 42, a cross bolt 90, with a retaining nut 91, outside of, and next to the bearing ring 54, so as to serve as an extra holding means to retain the ring 54, and at the same time strengthen the joint across the posts, integral with the post plate 43. These cross bolts pass through the circumferential slots 38 in the ball-like element 21, in which they are free to oscillate in the action of the joint.

Referring now to the form of universal joint shown in Figures 9 to 11 inclusive, the ball element 57 has integral therewith the four posts 58, secured to the post plate 59, by the screws 60. A cap plate 61 is secured by bolts 62 to the post plate 59. Integral with the cap plate 61, is the central boss cup 63, into which fits the shaft 64, secured by the set screw 65. On the surface of the ball element 57 are two meridian grooves 66 and 67 crossing at right angles, so that the line of intersection of the planes of these meridian grooves is co-incident with the axis of the shaft 64. In the groove 66 slidingly fit the curved shoes 68 and 69, positioned diametrically opposite one another, and have journaling lugs 70 integral therewith. These lugs 70 are journaled in a ring 71, threaded with the posts 72 and 73 integral with the post member 74. Similarly, the curved shoes 75 and 76 slidingly fit the groove 67, and are positioned diametrically opposite one another and have journaling lugs 77 integral therewith. These lugs 77 are journaled in other rings 71, threaded with the posts 78 and 79 integral with the post member 74.

In the ends of the posts 72, 73, 78, and 79, are slots 85, which slidingly fit the lugs 70 or 77 for the same to pass through to be engaged by the threaded rings 71. Set screws 86 in the tops of the posts 72, 73, 78, and 79 fix the rings 71 in place. A cap plate 80 is secured by bolts 81 to the post member 74. Integral with the cap plate 80 is the central boss cup 82, into which fits the shaft 83, secured by the set screw 84.

The ball element 57, has passing through it two radial slots 92, each narrower than and in the plane of one of the meridian grooves 66 or 67. The bolts 90, of this joint, are free to oscillate in their respective slots 92.

Having described our invention in two forms thereof, we will now explain the functioning of the parts in each. Considering the joint 20 shown in Figures 1-7, assume that 31 is the driving shaft and 52 the driven shaft. In the rotative position of the parts shown, the ball-like element 21 with the half ring shoe 41 slidingly fitting the groove 34 will, when the shaft 31 begins to turn, cause a sliding movement of the shoe 41 within the groove 34 in a direction governed by the direction of rotation of the shaft 31, causing one of the lugs 42, on the shoe 41, to move into the space between adjoining posts 22 on one side, and the opposite lugs 42 to move away from a like space between adjoining posts 22, on the other side; turning the posts 44, 45, 46, and 47 and parts, with the shaft 52 connected therewith. While the lugs 42, on the shoe 41, are moving one toward the shaft end 31 and the other away, the movement of the lugs 42 on the shoe 40 are moving in the reverse order. It is evident from the drawing that the maximum angle which the shaft 52 can have away from an alignment with the shaft 31, is governed by the clearance space between adjoining posts 22, permitting the depth of entrance of the end of a post, as 44, into such clearance space. Figure 1 shows a maximum angle from alignment of shafts to be 45° for the joint as there designed. By pivoting the posts 44, 45, 46, and 47 upon curved half ring shoes, fitting into meridian slots, in a ball member, the center of which is always in line with the axis of the shaft to which it is connected rigidly, instead of pivoting only two of the posts 44, 45, 46, and 47 directly to a third intermediate member, not rigidly connected with the shaft 31 but to two posts on the member 24 suitably spaced, we are making use of four pivotal connections all having the same office and each taking its part of the load instead of two pivotal connections transferring the load through a third freely turning member to two other pivotal connections. Thus our universal joint can transmit twice the power, compared with the ordinary joint of this class of the same size. One point in the construction designed both for strength and to tie the joint together, is the employment of curved shoes extending half way around the ball-like element 21, having the lugs 42 integral with the shoe and on opposite ends thereof to be in the same pivotal axis. This arrangement reduces the number of curved shoes required to two, while at the same time the joint is materially strengthened, being tied together in a manner permitting the free action of all the parts. Figure 5 was drawn with the object of illustrating the tying-in relation of these half ring, pivoted shoes 40 and 41.

Referring now to the construction of the modified form of universal joint shown in the remaining figures, curved shoes 68, 69, 75, and 76, performing the same office as the shoes 40 and 41, shown in the other figures, but each shoe extends less than half way around the curved slot in the ball-like element which it occupies, and has only one pivoting lug. It will be noticed that these shoes 68, 69, 75, and 76 occupy deep meridian grooves in the ball-like element giving as much keying surface as possible. While we have shown cross bolts 90, in each form of joint passing through the ball-like element of the joint, these may be dispensed with where the joint does not have much force to transmit through it while running.

Other forms of universal joints can be made embodying our invention without departing from the spirit and scope thereof, we therefore wish to include all forms, which come within the purview of the following claims.

We claim,

1. A universal joint for connecting two shafts said joint including a ball member, a pivot holding member partly enveloping said ball member, attaching means for connecting said ball member to one of said shafts, other attaching means for connecting the other of said shafts with said pivot holding means, a ball part to said ball member, two meridian grooves in said ball part, whose planes intersect at right angles, in a line co-incident with the axis of said ball member and its shaft attaching means, a slot thru said ball part, in the plane of each of said grooves, curved shoes slidingly fitting said grooves, pivots integral with said shoes, a pivot holding extension portion to said pivot holding member having its outer end part enveloping said ball part in the plane of its center, four pivot holding rings fitting said pivots and releasably mounted at right angles to one another in the outer end part of said pivot holding, extension portion, releasable holding means for releasably holding each of said rings in said extension portion, said rings engaging said pivots, and a cross bolt passing thru opposite pivots of a pair of said pivots, and passing thru said slot, and means for retaining said bolt in fixed relation to the pair of pivots on said shoes that it passes thru.

2. In a universal joint having a ball member, meridian grooves in said ball member, another member surrounding said ball member, slots in said last named member positioned to have a slot opposite each groove in said ball member, a threaded hole in said last named member, merging into each of said slots, a ring threaded with each of said holes, a curved shoe engaging each of the said grooves, and a pin extension from each of said shoes, entering said ring.

3. A universal joint for connecting two sharts, comprising a pivot holding member, attaching means fixing one of said shafts to said pivot holding member, a ball member, other attaching means fixing the other of said shafts to said ball member, a ball part to said ball member, positioned to be partly enclosed by said pivot holding member, pivot holding means on said pivot holding member, two meridian grooves in said ball part, whose planes intersect at right angles, in a line which is co-incident with the axis of the shaft connected with said ball member, a pair of longitudinally curved shoes slidingly fitting, and oppositely, diametrically, disposed in each of said meridian grooves, each of said shoes occupying less than 180° of arc of the groove which it fits, and a pivot element connecting each of said shoes with said pivot holding means, all four of said pivot elements being on a plane substantially perpendicular to the axis of said pivot holding member, which is in line with said shaft attached thereto.

4. A universal joint for connecting two shafts, comprising a pivot holding member, attaching means for fixing one of said shafts to said pivot holding member, a ball member, other attaching means fixing the other of said shafts to said ball member, a ball part to said ball member, positioned adjacent said pivot holding member, pivot holding parts to said pivot holding member, surrounding said ball part, two meridian grooves in said ball part, whose planes intersect at right angles, in a line which is co-incident with the axis of that shaft connected with said ball member, a semi-circular shoe slidingly fitting one of said grooves, a pivot at each end of said shoe, connected with said pivot holding parts, the pivots of said shoe having a common axis, passing substantially through the center of said ball part, a second semi-circular shoe, slidingly fitting the other of said grooves, and positioned on the opposite side of said ball part, to have the body of said ball part held between said semi-circular shoes, pivot ends to said last named second semi-circular shoe, said last named pivot ends being connected with said pivot holding parts, with the axis of all pivots being substantially in a plane passing through the center of said ball part.

5. A universal joint for connecting two shafts, comprising a pivot holding member, attaching means fixing one of said shafts to said pivot holding member, a ball member, other attaching means fixing the other of said shafts to said ball member, a ball part to said ball member, positioned adjacent to said pivot holding member, to envelope part of said ball part, of said ball member, pivot holding parts to said pivot holding member, two meridian grooves in said ball part, whose planes intersect at right angles in a line co-incident with the axis of the shaft connected with said ball member, a pair of longitudinally curved shoes, in sliding engagement with one of said grooves, the shoes of said pair being diametrically positioned on opposite sides of said groove, which they occupy, a second pair of longitudinally curved shoes in sliding engagement with the other of said grooves, said last named shoes being diametrically positioned on opposite sides of tne groove which they occupy, each of said shoes occupying less that 180° of arc, of the groove it occupies, a pivot connecting each of said longitudinally curved shoes with said pivot holding part, and all of said pivots being substantially in the same plane passing through the center of said ball part.

PETER C. MANCINO.
HERBERT CROSS.
JOHN EDWARD THEBAUD.